United States Patent [19]

Delzenne et al.

[11] Patent Number: 4,914,271

[45] Date of Patent: Apr. 3, 1990

[54] ARC WORKING TORCH AND MACHINE, AND CARTRIDGE FOR SAID TORCH

[75] Inventors: Michel Delzenne, Franconville; Pierre Legrand, Pontoise, both of France

[73] Assignee: L'Air Liquide, Societe Anonyme pour L'Etude et L'Exploitation des Procedes Georges Claude, Paris, France

[21] Appl. No.: 295,381

[22] Filed: Jan. 10, 1989

[30] Foreign Application Priority Data

Jan. 25, 1988 [FR] France .................... 88 00782

[51] Int. Cl.$^4$ ................................ B23K 9/00
[52] U.S. Cl. .................... 219/121.48; 219/69.1
[58] Field of Search ........... 219/121.36, 121.48, 219/121.53, 121.52, 121.5, 69.1, 69.15, 70, 76.14, 76.16, 138, 139; 29/568; 313/231.31, 231.41; 279/1 A, 1 B, 79, 80

[56] References Cited

U.S. PATENT DOCUMENTS

| | | | |
|---|---|---|---|
| 4,316,071 | 2/1982 | Bonga | 219/69.15 |
| 4,563,800 | 1/1986 | Bonga | 219/69.1 |
| 4,590,354 | 5/1986 | Marhic et al. | 219/121.48 |
| 4,670,635 | 6/1987 | Johnson et al. | 219/69.15 |
| 4,682,005 | 7/1987 | Marhic | 219/121.48 |
| 4,791,268 | 12/1988 | Sanders et al. | 219/121.48 |

FOREIGN PATENT DOCUMENTS

| | | | |
|---|---|---|---|
| 134045 | 3/1985 | European Pat. Off. | 219/138 |
| 0144267 | 6/1985 | European Pat. Off. | |
| 0193456 | 9/1986 | European Pat. Off. | |
| 1349668 | 12/1963 | France | |

*Primary Examiner*—Philip H. Leung
*Assistant Examiner*—Geoffrey S. Evans
*Attorney, Agent, or Firm*—Young & Thompson

[57] ABSTRACT

Arc torch for plasma arc cutting or welding comprising an interchangeable cartridge comprising an electrode and a nozzle, and connecting elements between the cartridge and the body of the arc torch to axially insert and remove the cartridge by a purely rectilinear movement. The arc torch can be used as part of a machine comprising a station for extracting used cartridges and a station for loading new cartridges into the arc torch.

14 Claims, 6 Drawing Sheets

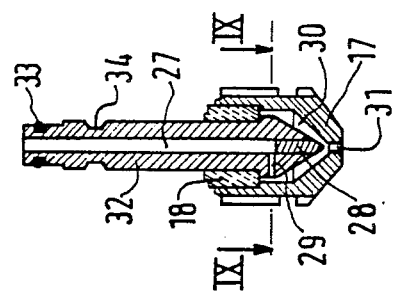
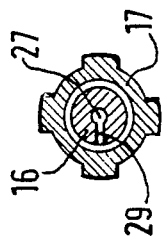
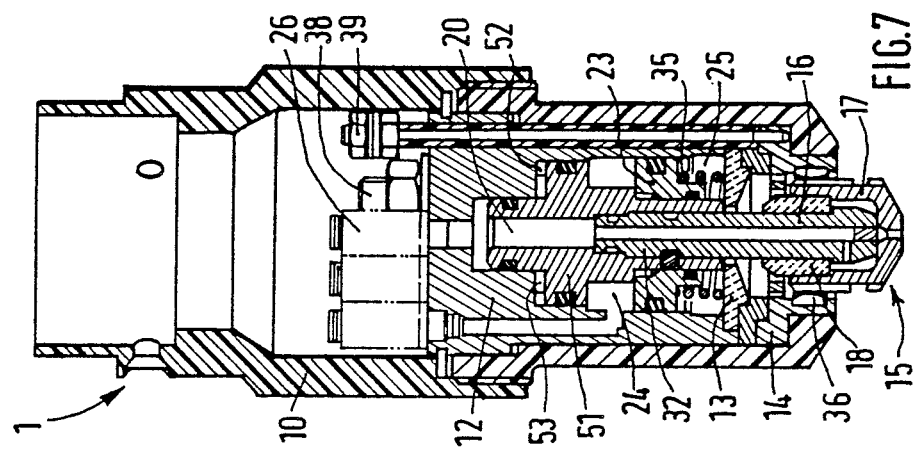
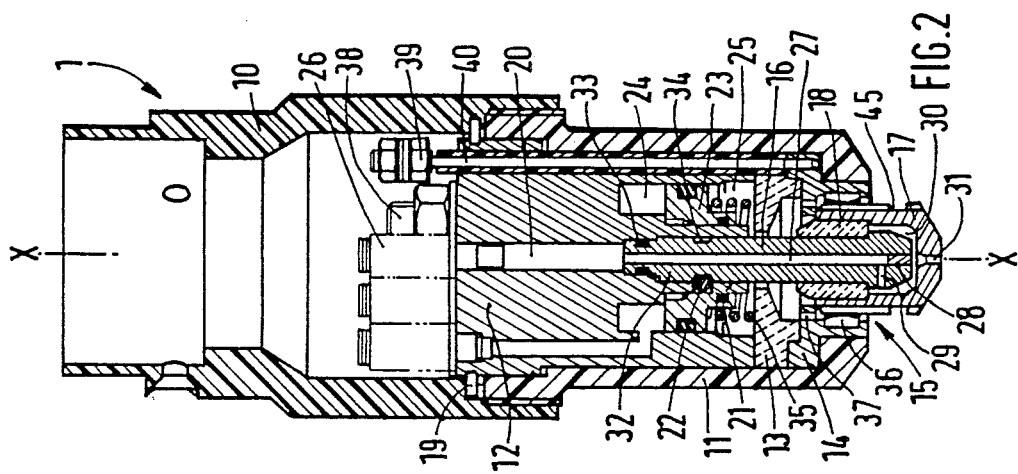

ARC WORKING TORCH AND MACHINE, AND CARTRIDGE FOR SAID TORCH

The present invention relates to arc working torches of the type comprising a torch body adapted to receive an interchangeable cartridge comprising an electrode and a nozzle. It is in particular applicable to welding or cutting torches employing a plasma jet.

FR-A-2,578,137 discloses an arc working torch of the aforementioned type in which the tail portion of the electrode is screwed into the inner end of a cavity of the torch body. This design is suitable for manual torches but is not well adapted to automatic plasma welding or cutting machines. Indeed, recent developments in these machines result in highly increased reates of feed and, under these conditions, the immobilization time required for replacing worn parts (electrodes and nozzles) must be reduced to a minimum.

An object of the invention is to provide a torch which is particularly well adapted to rapid automatic machines.

For this purpose, the invention provides an arc working torch of the aforementioned type, wherein the connecting means between the body and the cartridge comprises means for axially inserting the cartidge in the body and means for locking the cartridge in position in the latter.

In an advantageous embodiment, the locking means comprise at least one ball retained in a cage of the torch body and means for biasing this ball or balls into a groove in the cartridge.

In the version of the torch ignited by a short circuit, the electrode and the nozzle are mounted to be mutually axially movable and the torch body comprises means for biasing the electrode or the nozzle, preferably in the direction for separating them from each other, and return means operative in the opposite direction.

The invention also provides a cartridge for an arc working torch such as that defined hereinbefore. In this cartridge, the electrode has a smooth tail portion and the cartridge has a recess, in particular a groove, for receiving a locking means.

The invention further provides an arc working machine comprising an arc working torch such as that defined hereinbefore, and means for selectively positioning said torch.

Some embodiments of the invention will now be described with reference to the accompanying drawings, in which:

FIG. 2 is a longitudinal sectinal view of a plasma cutting torch with which the machine showed in FIG. 1 is equipped;

FIG. 7 is a longitudinal sectional view of a variant of the torch shown in FIG. 2;

FIG. 8 is a longitudinal sectional view of a cartridge which is interchangeable with those shown in FIGS. 2 and 7;

FIG. 9 is a sectional view taken on line IX—IX of FIG. 8;

Figure 1:
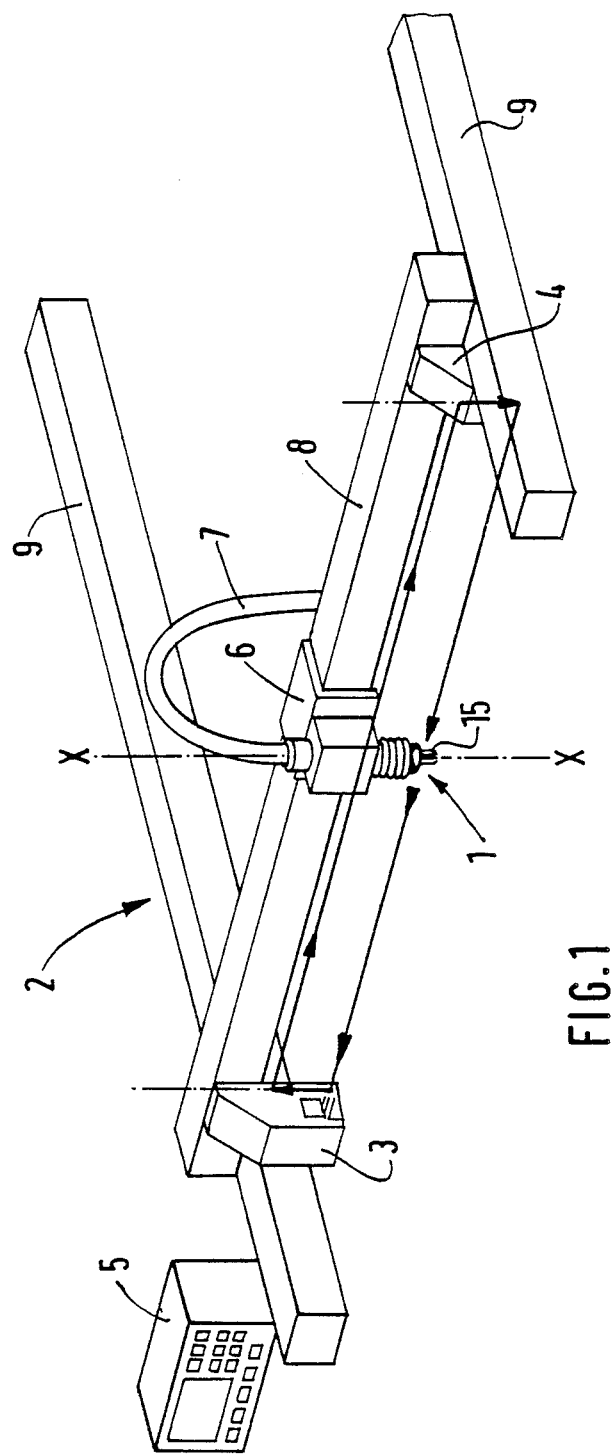
FIG. 1 is an assembly perspective view of an automatic plasma cutting machine according to the invention.

The machine shown in FIG. 1 is a numerically-controlled machine for effecting a high-speed (for example 15 to 20 m/min) automatic plasma cutting of metal sheets. It mainly comprises a torch 1 carried by an XY shifting device 2, a used cartridge extracting station 3, a new cartridge loading station 4, and a control unit 5. The device 2 includes a torch-carrying carriage 6 provided with electric and gas supplies 7, this carriage being slidable on a cross-member 8 whose two ends roll on two longitudinal beams 9. The carriage 6 further comprises means (not shown) for raising and lowering the torch 1 along its vertical axis XX.

Before describing in detail the operation of the machine shown in FIG. 1, the structure of the torch 1 will be described with reference to FIG. 2. This torch, which is of the type ignted by high frequency, comprises, on one hand, a torch body formed by an outer body and an inner body, and, on the other hand, an interchangeable cartridge. The outer body, of generally annular shape, comprises an upper element 10 of insulating material connected to the carriage 6, and a lower element 11 which is also insulating and screwed to the element 10; the inner body is formed by an upper conductive body 12, an insulating block 13 and a lower conductive body 14; the interchangeable cartridge 15 is constituted by an electrode 16 and a nozzle 17 separated by an insulator 18.

The upper body 12, held stationary in the element 10 by means of a circlip 19, has an axial bore 20 whose lower part is of increased diameter. A deep annular groove extending from the lower end face of the body 12 surrounds the bore 20. A sleeve 21, provided with a ring arrangement of orifices, separates the groove from this bore. A ball 22 is disposed in each orifice and a locking ring 23 is slidable in a sealed manner in the groove and defines a hermetic upper chamber 24 and a lower chamber 25. Ducts provided in the body 12 open onto the chambers 24 and 25 respectively and are connected, together with the bore 20, to pneumatic connectors 26 mounted on the upper face of the same body.

The electrode 16 has a generally tubular shape with an axial bore closed at its lower end by an insert 28 of zirconium or hafnium constituting the electrode proper. A horizontal duct 29 tangent to the bore 27 is provided in a position a little above the insert 28. The insulator 18 is positioned a little above the duct 29 by an outer shoulder of the electrode and the nozzle 17 is fixed by a setting operation to this insulator so as to provide between the electrode and the nozzle a plasma-producing gas chamber 30. The nozzle includes an axial bore 31 for the outlet of the plasma jet, and a series of outer longitudinally extending fins.

The upper part 32, or tail part, of the electrode, is provided close to its end with a sealing element 33 and includes a circular groove 34. To place the cartridge in position, the ring 23 is brought to its lower position, which brings an inner recess of this ring into facing relation to the balls 22. The tail part 32 is then moved into the bore 20 until it abuts against the inner end of the enlarged part of this bore. The groove 34 is then in facing relation to the balls and the ring 23 is raised, which pushes the balls into the groove 34 and locks the cartridge. The reverse operations enable the cartridge to be instantaneously extracted for replacement purposes. Note that, in the absence of a cartridge, a small lip (not shown) provided on the edge of the orifices of the sleeve 21 on the inner side, prevents the balls leaving these orifices.

The insulating block 13 is a disc provided with a central aperture for the passage of the tail part 32 of the electrode with a large clearance. It is applied against the lower face of the body 12 and a spring 35 is compressed between this block and the ring 23 so as to permanently bias this ring 23 to its upper locking position.

The lower body 14 is another disc of an electrically conductive material having a central passage for the cartridge 15. It is provided with an elastically yieldable sleeve 36 for guiding the nozzle 17 with a gripping effect exerted on the fins of the nozzle. The body 14 also includes a ring arrangement of orifices 37 for the escape around the nozzle of the gas injected into the chamber 25.

As concerns the electric connections, there are shown above the upper body 12 a terminal 38 (for example, negative) common to the three high-frequency circuits, the pilot and power arc, and a terminal 39 connected through a conductor 40 to the lower body 14, common to the first two circuits, the other pole of the power circuit being connected to the workpiece to be cut. The elastically yieldabe sleeve 36 ensures the electric contact between the terminal 39 and the nozzle 17.

In operation, with the torch of FIG. 2 mounted on the machine of FIG. 1, the desired cutting is effected in the conventional manner by shifting the carriage 6 along the provided cutting contour, the workpiece to be cut being placed flat under the torch. After a certain number of arc strikings or a certain number of hours of continuous operation corresponding to a predetermined wear of the electrode or of the nozzle, one proceeds to the following cycle of operations which are controlled either manually or automatically by a numerical control, micro-computer or a programmable automaton:

neutralization of the cutting functions;
transfer of the torch to the extracting station 3;
unlocking of the cartridge 15 by putting the upper chamber 24 under pressure;
extraction of the cartridge in the manner described hereinafter;
transfer of the torch without the cartridge to the loading station 4;
placing in position of a new cartridge in the manner described hereinafter;
locking of the new cartridge by putting the lower chamber under pressure;
return of the torch to the original point of the beginning of the program;
activation of the cutting functions.

Figure 3:
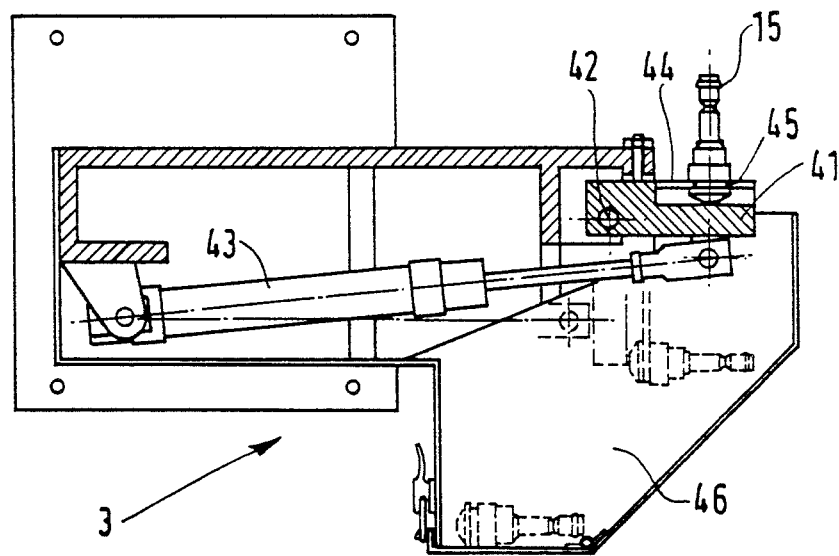
FIG. 3 is an elevational and sectional view of a cartridge extracting station of the machine shown in FIG. 1.
Figure 4:
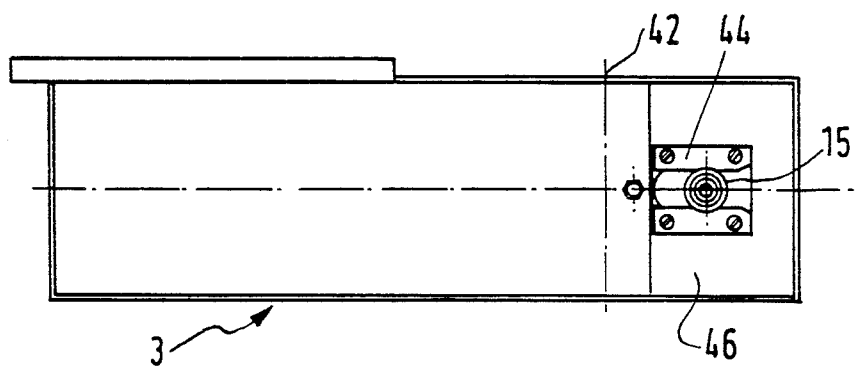
FIG. 4 is a corresponding plan view.

The extracting station 3 shown in FIGS. 3 and 4 mainly comprises a pivotal slideway 41 pivotally mounted on a horizontal shaft 42 parallel to the beams 9 and shifted by a pneumatic jack 43. The slideway is parallel to the beam 8 and includes two parallel flat members 44. When the torch reaches the station 3, these two members are engaged in a discontinuous groove 45 provided in the fins of the nozzle (FIG. 2), then, after the unlocking of the cartridge, the torch body is raised by the carriage 6 until the cartridge 15 is completely disengaged, this cartridge then having the position shown in FIGS. 3 and 4. By retracting the jack 43, the slideway 41 pivots and the cartridge drops into a recipient 46 of the station 3, as illustrated in dashed lines in FIG. 3.

Figure 5:
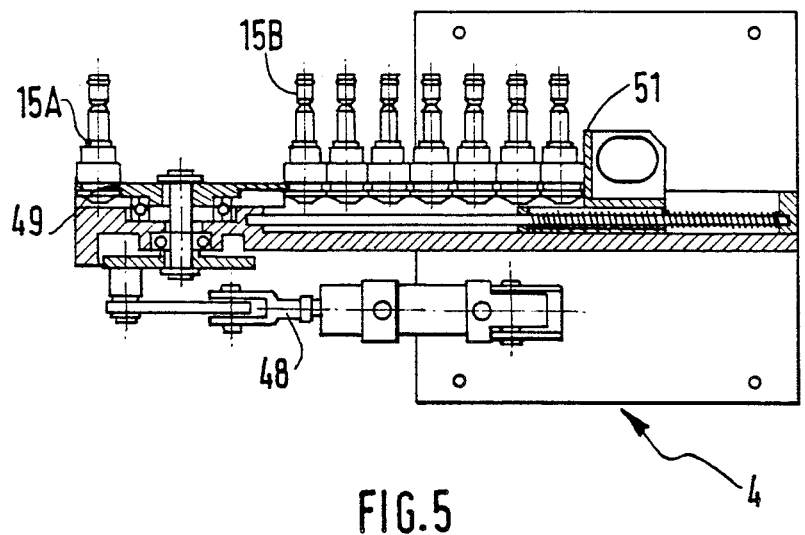
FIG. 5 is an elevational and sectional view of a cartridge loading station of the machine shown in FIG. 1.
Figure 6:
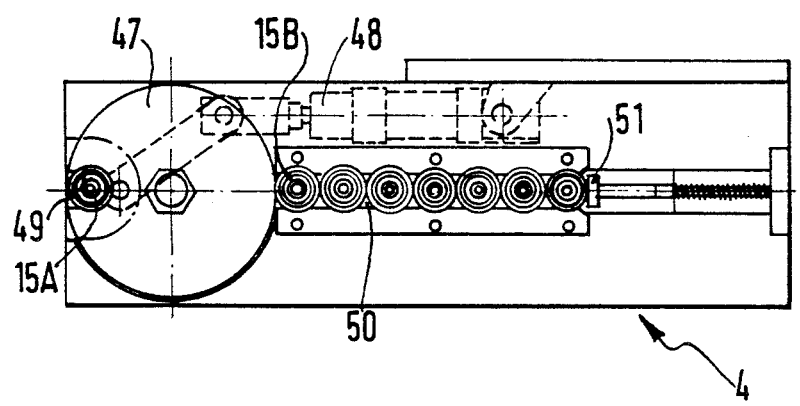
FIG. 6 is a corresponding plan view.

The loading station 4 shown in FIGS. 5 and 6 mainly comprises a rotary plate 47 shifted in a to-and-fro semi-rotation by a pneumatic jack 48 and a link-crank system, and provided with a notch 49 adapted to engage in the groove 45 of a cartridge 15, and a horizontal slideway 50 parallel to the cross-member 8 and arranged in the same way as the slideway 41 but of greater length, this slideway 50 acting as a reserve supply of new cartridges.

In the illustrated standby position, the notch 49 is located at the opposite end of the slideway 50 and contains a cartridge 15A while the line of waiting cartridges is biased towards the other side of the plate 47 by a spring-pressed pusher 51. To load a new cartridge, the torch body is positioned coaxially with the cartridge 15A above the latter and is lowered by the carriage 6. The tail part of the electrode is mounted in the bore 20 while the chamber 24 is put under pressure, then the chamber 25 is put under pressure and the chamber 24 depressurized in order to ensure the locking of the cartridge 15A. The torch then moves away horizontally in a direction parallel to the cross-member 8. Then, by a movement of the plate 47 through a semi-rotation, the notch 49 takes hold of the first cartridge in the reserve 15B and the plate returns to its standby position ready for the following loading of the torch 1.

As a variant, the station 4 could comprise a plurality of cartridge reserves, each corresponding to a given type of cartridge and disposed in a star arrangement around the rotary plate 47.

Consequently, the cartridge loading operations can be carried out automatically and extremely rapidly owing to the instantaneous unlocking and locking of the cartridge by means of the ring 23.

Note that the gas injected into the chamber 25 constitutes both the means for locking the cartridge and gas flow for cooling the torch, this gas flowing around the nozzle 17. Consequently, the pressure for locking the ring 23 is lower than the unlocking pressure (the chamber 24 being hermetic), and the difference between the two pressures is compensated by the spring 35.

FIG. 7 shows a variant of FIG. 2 which differs from the latter only by the following points:

the electrode mounted to be slidable in the insulator 18 between a lower arc-striking position in which is abuts against the nozzle 17 and an upper working position in which it abuts against the insulator;

a part of the upper body 12 constitutes an electrode holder 51 forming a piston. An upper chamber 52 connected to a connector such as 26 and defined above this piston contains an annular spring 53 which biases the latter downwardly so that the chamber 24 becomes an intermediate chamber.

From the electrical point of view, the high-frequency supply is eliminated, the arc being struck by a short curcuit. The table of the following page shows the sequences of the supply of the pneumatic circuits, on one hand, in normal operation (arrows in full lines), on the other hand, when replacing a cartridge (arrows in dot-dash lines).

As can be seen in FIGS. 8 and 9, for each type of ignition (high-frequency or short-circuit), cartridges may be used with the same torch body which have a different internal configuration but are externally identical and therefore interchangeable. Thus, the cartridges shown in FIGS. 2 and 7 are adapted for an oxidizing plasma-producing gas (air or oxygen): the central bore 27 of the electrode communicates with the chamber 30 through one or more ducts 29 disposed as a vortex, i.e. tangent to the bore 27, and the electrode has a flat end. On the other hand, the cartridge shown in FIGS. 8 and 9 corresponds to the case of a neutral plasma-producing gas (for example argon): the duct or ducts 29 are radial and the end of the electrode is pointed; more precisely, the insert 18 is itself pointed and it is preferably made from tungsten. More generally, a large variety of cartridges may be used which are adapted to the power of the arc, to the type and thickness of the materials to be cut, and/or to the type of the plasma-producing gas.

sealing effect, against the shoulder 62 defined in the skirt 61. A chamber 65 is then defined by the insulator 59, the ring 23, and the body 54 and a calibrated radial duct 66 provided in this body connects this chamber 65 to the bore 20.

Furthermore, an annular electronically insulating thrust means 67 is slidable in the lower body 63. It is associated with an elastically yieldable metal gripper 68 having a plurality of downwardly extending claws, the assembly being biased upwardly into abutment against the end edge of the sleeve 21 by a metal spring 69. The thrust means 67 surrounds the tail part 32 of the electrode with a marked radial clearance From the electrical point of view, the potential of the electrode is established through the body 54, and the potential of the nozzle through the body 63, the spring 69 and the gripper 68.

The torch shown in FIGS. 10 and 11 operates in the following manner.

To place the cartridge 15 in position, as before, it is mounted axially in the torch body. Owing to the elastically yieldable ring 58, the balls are engaged or clipped in the groove 34 of the electrode and effect a pre-locking of the cartridge. The claws of the gripper 68 then

|  | UPPER PRESSURE CHAMBER 52 | MEDIAN PRESSURE CHAMBER 24 | LOWER PRESSURE CHAMBER 25 | PLASMA-PRODUCING GAS (BORE) |
|---|---|---|---|---|
| Locking of the cartridge | 1 | 0 | 1 | 0 |
| Unlocking of the cartridge | 1 | 1 | 0 | 0 |
| Short-circuiting electrode-nozzle | 1 | 0 | 0 | 1 |
| Striking of pilot arc | 0 | 0 | 1 | 1 |
| Transfer of power arc between electrode and workpiece Breaking of pilot arc Cutting sequence | 0 | 0 | 1 | 1 |
| Breaking of power arc Stoppage of cutting | 0 | 0 | 0 | 0 |

Figure 11:
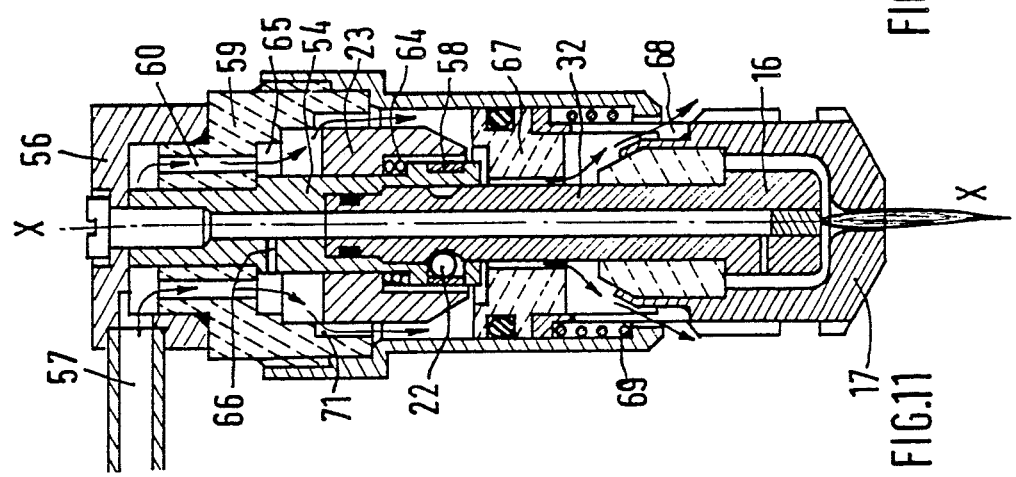
FIG. 11 is a similar view of the torch shown in FIG. 12, in operation.
Figure 10:
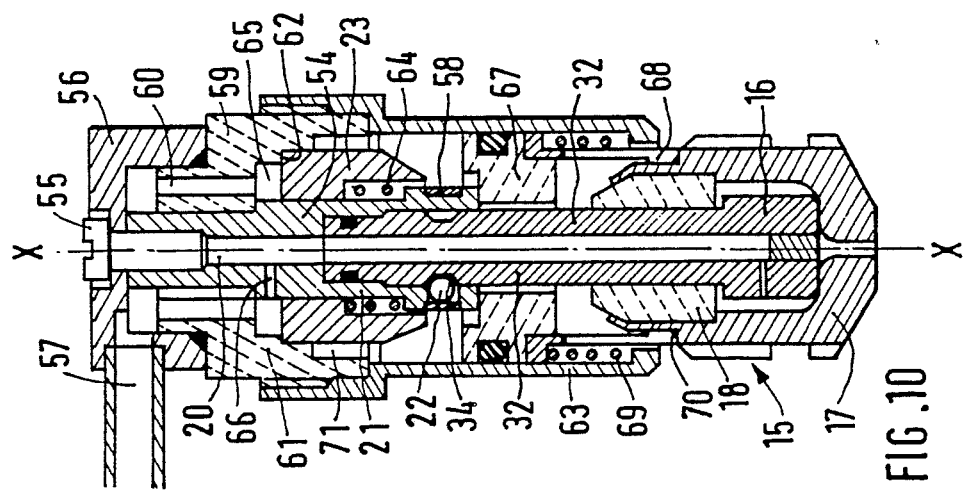
FIG. 10 is a longitudinal sectional view of another torch adapted for an automatic machine such as that shown in FIG. 1.

The torch shown in FIGS. 10 and 11 is a variant of the torch of FIG. 7 and may be equipped with the same cartridge 15. It differs therefrom by the structure of the torch body which comprises:

an upper tubular conductive body 54 on which a cap 56 is fixed by a screw 55; the cap has a lateral gas inlet 57; the lower end of the body 54 forms the same sleeve 21 as before, except that the balls 22 are constantly biased toward the axis X—X by an elastically yieldable ring 58;

an intermediate insulator 59 surrounding the upper part of the body 54, provided with a ring arrangement of axial passages 60 and extended downwardly by a skirt 61 which has an inner downwardly facing shoulder 62;

a lower conductive tubular body 63 fixed to the skirt 61.

The ring 23 is slidable on the body 54. It has an inner recess housing an upward return spring 64 which bears against an outer shoulder of the sleeve 21. In the upper unlocking position, the ring 23 is applied, with a relative elastically surround the upper part of the nozzle 17 which is of reduced outside diameter and are in facing relation to the shoulder 70 thus formed on this nozzle. The nose of the electrode 16 is in mechanical, and therefore electrical, contact with the inner end of the nozzle 17.

When the operator causes the striking of the arc of the torch, an auxiliary electric supply is established which results in a short circuit between the electrode and the nozzle. At the same time, an electrically-operated valve is opened and supplies a gas pressure to the chamber 65 through the inlet 57 and the passages 60. A part of the gas is deviated in this region to the plasma-producing circuit, i.e. in the bore 20, and the central conduit of the electrode, through the calibrated duct 66. When the pressure in the chamber 65 is greater than the thrust exerted by the spring 64, the ring 23 descends along the body 54 until it puts the chamber 65 in communication with a series of axial grooves 71 provided in the insulator 59 and extending from the lower face of this insulator up to a level located a little below the shoulder 62.

A situation of equilibrium is then established between the pressure of the gas exerted on the ring 23 and the thrust exerted by this ring 64. In this position, the ring 23 caps the elastically yieldable ring 58 and prevents it from undergoing the expansion necessary for releasing the balls 22 from the groove 34. In this way, so long as the gas pressure is maintained, it is impossible to remove or eject the cartridge.

A pressure is in turn exerted on the upper face of the member 67 which compresses the spring 69 and causes the downward sliding of the assembly comprising the member 67, the gripper 68 and the nozzle 17, until the electrode rearwardly abuts against the insulator 18 of the cartridge. This is the position shown in FIG. 11.

This movement creates, in a period of transition, the conditions which facilitate a sparking between the end of the electrode and the inner end of the nozzle which is itself propitious to the ignition of the pilot arc. Moreover, as the member 67 is separated from the end of the body 54, the gas is able to flow between the central bore of the member 67 and the tail part of the electrode while at the same time ensuring the cooling of the latter, and flow through the slots between the claws of the elastically yieldable gripper on the spring 69 and on the fins of the nozzle, thereby cooling all these elements.

Following on the ignition of the pilot arc, if a workpiece to be cut correctly connected to the electric power supply is at a suitable distance from the nozzle, the transfer of the arc from the electrode to the workpiece can occur and the cutting sequence can commence.

There is consequently provided a torch which is ignited by a short circuit with a fixed electrode and a movable nozzle which may be suitable for a rapid automatic machine.

Instead of a single gas supply as shown in FIG. 10, the torch may include (FIG. 12) two supplies, one being for a cooling gas similar to the inlet 57, and the other 72 for a plasma-producing gas which opens directly onto the bore 20 of the body 54 through a bore in the cap 56.

FIGS. 13 to 16 show various variants of the cartridge 15 of FIG. 7, all of which employ a sleeve 73 carried by the electrode 16 in which are provided ducts 74 opening onto the chamber 30. In the embodiment shown in FIGS. 13 and 14, the plasma-producing gas thus passes from the central conduit 27 of the electrode to the chamber 30 through ducts 29, an annular groove 75 of the electrode provided in facing relation to the sleeve 73, and ducts 74.

A first advantage of this arrangement resides in the possibility of increasing the angle x (FIG. 14) that the direction of the ducts 74 makes with the radial direction and therefore the effectiveness of the vortex of the plasma-producing gas. A second advantage resides in the possibility of using brass for the sleeve 73, which is much easier to drill than the copper constituting the electrode 16. Moreover, to change the type of plasma-producing gas flow, it is sufficient to change the sleeve 73.

Furthermore, the rear abutment of the electrode is achieved through an O-ring 76 which ensures a perfect seal in operation between the upper end of the sleeve 73 and the insulator 18.

Figure 13:
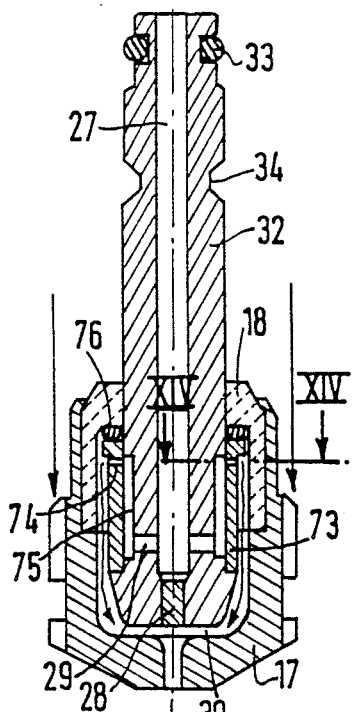
FIG. 13 is a longitudinal sectional view of another cartridge adapted for an automatic machine such as that shown in FIG. 1.
Figure 14:
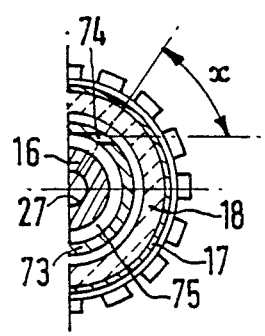
FIG. 14 is a partial sectional view taken on line XIV—XIV of FIG. 13.

The various configurations of FIGS. 13 to 17 correspond to the following cases:

FIGS. 13 to 14: This cartridge is well adapted to an operation with a power current of low magnitude.

Figure 15:
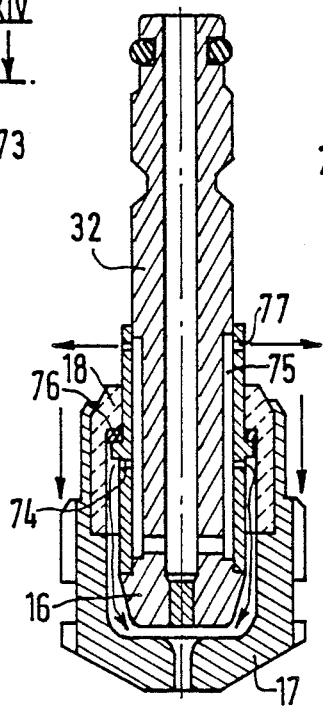
FIGS. 15 to 17 are views similar to FIG. 13 corresponding to variants.

FIG. 15: The sleeve 73 is extended upwardly beyond a shoulder which cooperates with the sealing element 76 to outside the insulator 18 where other escape orifices 77 are provided. This permits increasing the gas flow in the electrode and therefore, owing to an improved cooling of the latter, withstanding higher currents.

Figure 16:
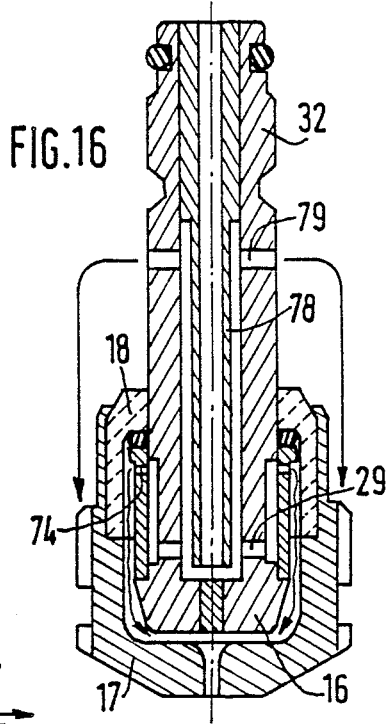

FIG. 16: This cartridge corresponds to a single supply of plasma-producing and cooling gas. The whole of the gas enters the electrode through a plunger tube 78 which descends nearly down to the insert 28 of the electrode. Thenceforth, a part of the gas is deviated into the groove 75 through the ducts 29 and constitutes the plasma-producing gas and the rest of the gas rises to the other ducts 79 provided in the tail part of the electrode above the insulator 18 to constitute the cooling gas. The ducts 29 and 79 provided in the same metal member 16 constitute a precise flow divider and the energetic cooling of the electrode by the whole of the gas flow permits working with still higher current magnitudes.

Figure 17:
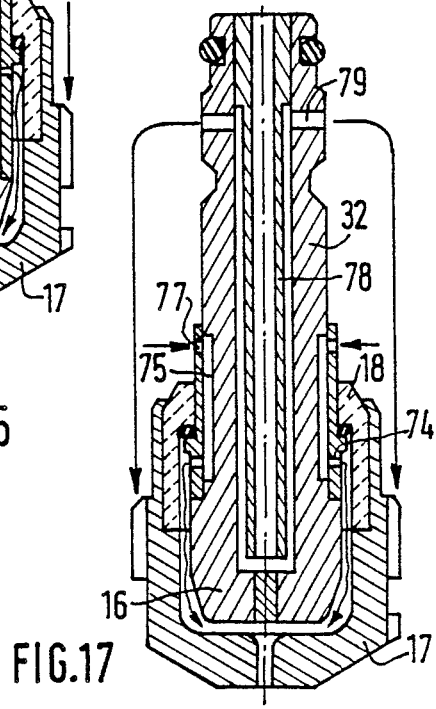

FIG. 17: This again concerns the long sleeve having ducts 77 shown in FIG. 15 and the plunger tube and the ducts 79 shown in FIG. 16, but the ducts 29 are eliminated. The ducts 77 serve to effect a separate introduction of the plasma-producing gas in the groove 75 which permits a precise regulation of its flow. Here again, the manner of cooling the electrode permits withstanding high current magnitudes.

As will be understood, the cartridges of FIGS. 13 to 17 may be employed in torches ignited by high-frequency by making the electrode and the nozzle fixed relative to each other.

Furthermore, all the torches described hereinbefore may be applied not only to the cutting of metals but also to the welding of metals (with use of a protective gas) or to the cutting and welding of non-metallic materials by the use of a blown arc.

Figure 12:
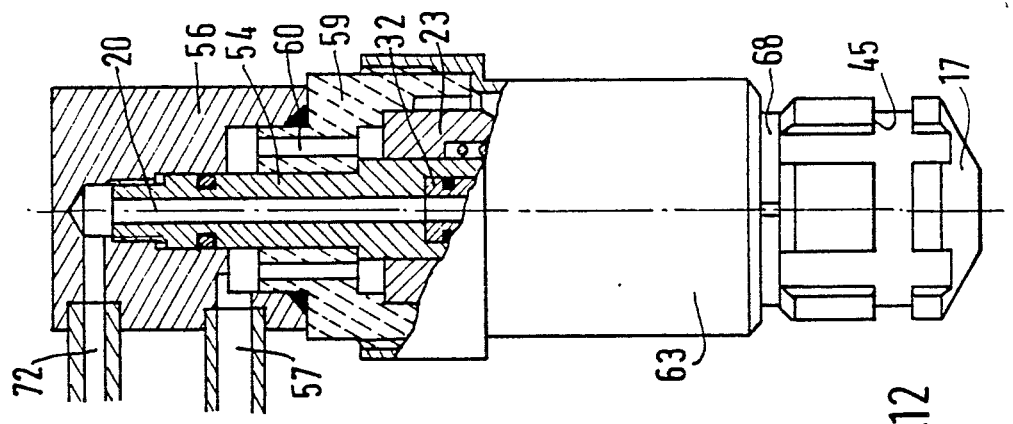
FIG. 12 is an elevational view, partly in section, of a variant of the torch shown in FIGS. 10 and 11.

Also note that, on principle, there is nothing to oppose the manual use of torches such as those described hereinbefore, although the particularly simple configuration of FIGS. 10 to 12 is better adapted to such use. In this case, there will be added to the torch a protective cap of the type conventionally employed in manual torches.

In the automatic version, the torches according to the invention may of course be carried by an articulated "robot."

We claim:

1. Arc torch comprising a torch body having an axis, an interchangeable cartridge comprising an electrode and a nozzle, and connecting means between the body and the cartridge comprising means for inserting the cartridge in the body by a purely rectilinear movement to a final position of the cartridge in the body, and means for locking the cartridge in said final position in the body, the torch body including a cage and the locking means comprising at least one ball retained in the cage, a groove in the cartridge and means for selectively biasing said at least one ball in to said groove when said cartridge is in said final position.

2. Arc torch according to claim 1, wherein the electrode has a tail part and the locking means act on the tail part of the electrode, the torch body having means for guiding the nozzle.

3. Arc torch according to claim 1, wherein the means for axially inserting the cartridge comprise reversible clipping means.

4. Arc torch according to claim 1, wherein the biasing means comprise a piston slidably mounted in said body, means defining a first chamber at a rear end of the piston, and a first gas inlet in said first chamber.

5. Arc torch according to claim 4, wherein means define a second chamber at a front end of the piston opposed to said rear end, the biasing means further comprise a second gas inlet in said second chamber, said second chamber opening onto a passage for gas for cooling the torch and being provided with a piston return spring biasing the piston toward said rear end.

6. Arc torch comprising a torch body having an axis, an interchangeable cartridge comprising an electrode and a nozzle, and connecting means between the body and the cartridge comprising means for axially inserting the cartridge in the body and means for locking the cartridge in position in the body, wherein the electrode and the nozzle are mounted to be mutually axially movable, and the torch body comprises means for biasing one of two elements consisting of the electrode and the nozzle in a given direction, and return means for returning said one of two elements consisting of the electrode and the nozzle in a direction opposed to said given direction.

7. Arc torch according to claim 6, wherein said direction is away from the other one of said two elements.

8. Arc torch according to claim 6, comprising means for introducing gas into the torch for actuating the locking means by causing the gas to act on the biasing means for separating the nozzle and the electrode.

9. Arc torch comprising a torch body having an axis, an interchangeable cartridge comprising an electrode and a nozzle, connecting means between the body and the cartridge comprising means for axially inserting the cartridge in the body and means for locking the cartridge in position in the body, and an insulator through which the electrode extends and on which insulator the nozzle is fixed, the electrode having a passage supplied with plasma-producing gas and communicating with a chamber defined between the electrode and the nozzle.

10. Cartridge according to claim 9, wherein the electrode slidably extends through the insulator.

11. Cartridge according to claim 9, comprising a perforated sleeve mounted on the electrode, said communication occurring through said perforated sleeve.

12. Machine for working with an arc, comprising an arc torch and means for selectively positioning the torch, the torch comprising a torch body having an axis, an interchangeable cartridge comprising an electrode and a nozzle, and connecting means between the body and the cartridge comprising means for axially inserting the cartridge in the body and means for locking the cartridge in position in the body; said machine further comprising a station for extracting used cartridges and a station for loading new cartridges.

13. Machine according to claim 12, wherein each of the extracting and loading stations comprises a slide for engaging in a groove provided on the nozzle of each cartridge.

14. Machine according to claim 12, wherein the loading station comprises supplies of a plurality of different types of cartridges.

* * * * *